United States Patent [19]

Kuhl et al.

[11] Patent Number: 4,501,430
[45] Date of Patent: Feb. 26, 1985

[54] MEANS OF SEALING OFF THE INSIDE OF A PULVERIZER

[75] Inventors: Wilhelm Kuhl, Essen; Dieter Kiefer, Wesel-Bislich; Max Josefowitz, Oberhausen, all of Fed. Rep. of Germany

[73] Assignee: Deutsche Babcock Werke Aktiengesellschaft, Oberhausen, Fed. Rep. of Germany

[21] Appl. No.: 553,486

[22] Filed: Nov. 18, 1983

[30] Foreign Application Priority Data

Dec. 1, 1982 [DE] Fed. Rep. of Germany ....... 3244362

[51] Int. Cl.$^3$ ............................................. F16J 15/40
[52] U.S. Cl. ........................................ 277/59; 277/71
[58] Field of Search ................. 277/58, 59, 71, 72, 277/216

[56] References Cited

U.S. PATENT DOCUMENTS

| | | | |
|---|---|---|---|
| 3,825,270 | 7/1974 | Pardmonoff | 277/59 |
| 4,101,139 | 7/1978 | Nordin | 277/59 |
| 4,196,910 | 4/1980 | Aizu | 277/59 |
| 4,199,153 | 4/1980 | Martin | 277/71 |
| 4,222,575 | 9/1980 | Sekiguchi et al. | 277/59 |
| 4,289,319 | 9/1981 | Hold | 277/59 |
| 4,332,392 | 6/1982 | Boehringer | 277/216 |

Primary Examiner—Robert I. Smith
Attorney, Agent, or Firm—Max Fogiel

[57] ABSTRACT

Means of sealing off the inside of a pulverizer, especially a bowl-mill pulverizer that has a horizontal rotating bowl-type grinding ring rigidly connected to a shaft, from the outside atmosphere. The means comprise a barrier-air chamber and ring seals in a ring-seal holder. The ring seals are slide rings that fit into grooves. They demarcate the barrier-air chamber. The ring seal on the side of the chamber that faces the inside of the pulverizer does not fit as tightly against its opposing surface (the shaft in one embodiment) as those on the other side.

6 Claims, 5 Drawing Figures

MEANS OF SEALING OFF THE INSIDE OF A PULVERIZER

BACKGROUND OF THE INVENTION

The present invention relates to means of sealing off the inside of a pulverizer, especially a bowl-mill pulverizer that has a horizontal rotating bowl-type grinding ring rigidly connected to a shaft, from the outside atmosphere, comprising a barrier-air chamber and ring seals in a ring-seal holder.

The ring-seal holder in known bowl-mill pulverizers is connected to the pulverizer housing, into which hot gases are blown during pulverization to dry and convey the pulverized material (*Aufbereitungs-Technik* 12, 9, 543 [1971]). The housing is accordingly subjected to thermal stress. This stress is transferred to the ring-seal holder in the form of radial and axial expansion in relation to the grinding-ring shaft, which is erected and secured precisely on the drive flange of the pulverizer drive mechanism. This expansion must be accepted by the ring seals that seal the mechanism off from the shaft. The ring seals of known pulverizers are made of brass and rigidly secured in the ring-seal holder. The aforementioned expansion subjects them to increased wear, which can lead to leakage. The ring-seal holder is sealed off from the housing with a deformable ceramic cord. Ceramic cords can be compressed under unfavorable conditions to the extent that the seal will leak. The air blown into the barrier-air chamber penetrates into the pulverizer through a gap between the shaft and the ring-seal holder and, in conjuction with the aforesaid ring seals, seals off the inside of the pulverizer from the atmosphere.

SUMMARY OF THE INVENTION

The object of the present invention is an improved means of sealing off the inside of a pulverizer of the aforesaid type.

This object is attained in accordance with the invention and using as a point of departure the aforesaid means of sealing off the inside of a pulverizer but wherein the ring seals are slide rings that demarcate the barrier-air chamber and wherein the ring seal on the side of the chamber that faces the inside of the pulverizer does not fit as tightly against its opposing surface as those on the other side.

The barrier-air chamber in this type of means of sealing can be completely accommodated in the ring-seal holder. The barrier-air chamber is sealed off from the atmosphere and from the inside of pulverizer with the slide rings. Slide rings have been used up to the present time only for shafts with a diameter shorter than that of the grinding-ring shaft. In the design in accordance with the invention the slide rings ensure perfect sealing even under the conditions of higher temperature and increased subjection to dust prevailing in a pulverizer. Barrier air can penetrate into the pulverizer through the ring seal at the greater distance. Their more effective sealing makes the means in accordance with the invention especially practical for pulverizers operating with high pressure in the pulverization space.

Some preferred embodiments of the invention will now be described with reference to the attached drawings, wherein

DETAILED DESCRIPTION OF THE PREFERRED EMBODIMENTS

Figure 1:
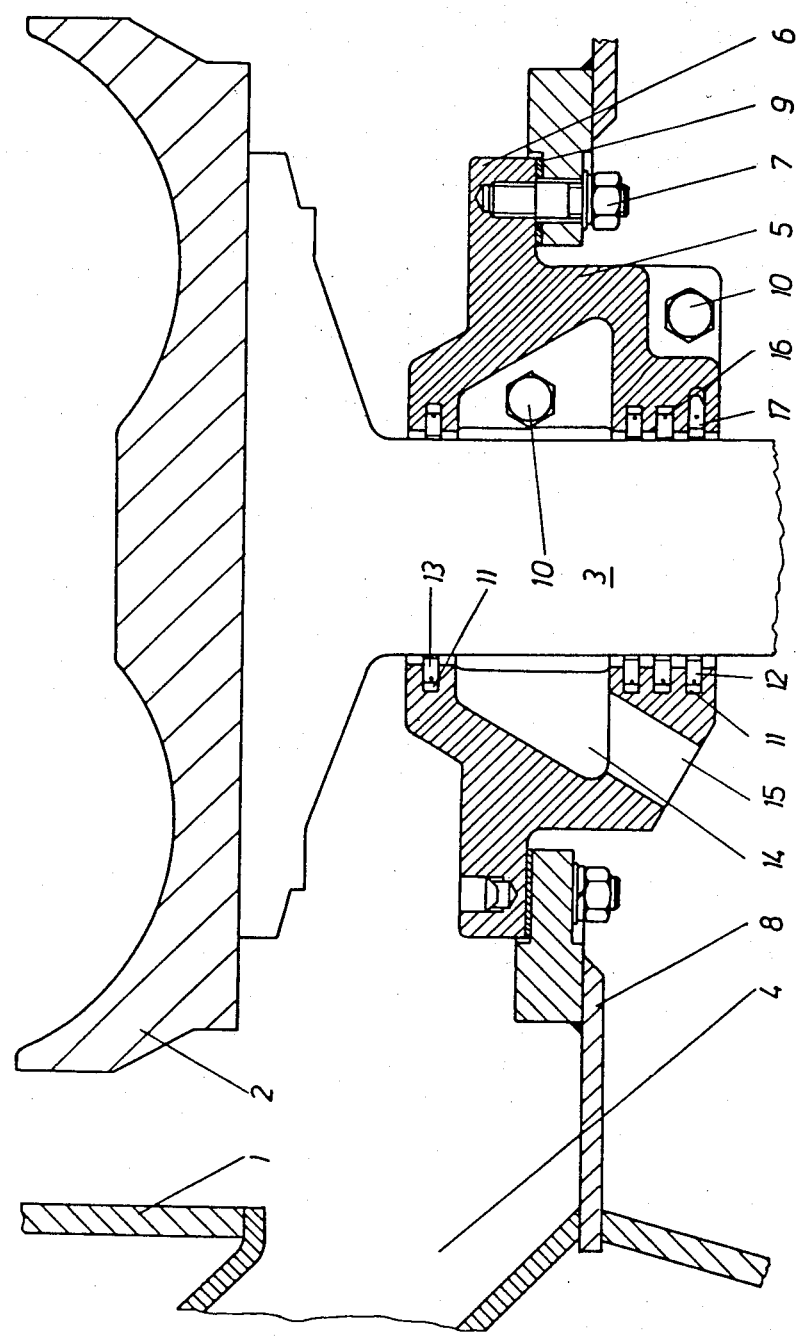
FIG. 1 is a longitudinal section through the grinding ring shaft of a bowl-mill pulverizer in accordance with the invention.

A bowl-mill pulverizer has fixed-position rollers, not illustrated, that engage a rotating bowl-type grinding ring 2 inside a housing 1. Grinding ring 2 is supported on a shaft 3 connected to the transmitting flange, not illustrated, of a drive mechanism. The bottom of housing 1, which encloses grinding ring 2, has a connection 4 for hot pulverization air that dries and conveys the pulverized material. Shaft 3 passes into housing 1. The entry is sealed off by a ring-seal holder 5 that surrounds shaft 3. Ring-seal holder 5 has an exterior annular flange 6 attached by a threaded connection 7 to the floor 8 of housing 1. Flange 6 is sealed off from housing floor 8 with flat packing 9 that is compressed by threaded connection 7.

Ring-seal holder 5 is in two parts fastened together by screws 10. Grooves 11 in ring-seal holder 5 accept ring seals 12 and 13, which are slide rings. As will be evident from FIG. 1, ring seals 12 and 13 surrounds shaft 3, demarcating a barrier-air chamber 14 in ring-seal holder 5. Barrier-air chamber 14 has a barrier-air connection 5. Barrier-air chamber 14 can also be divided radially into several sections, in which case each section will have a barrier-air connection.

The ring seals 12 on the side of the barrier-air chamber 14 toward the outer atmosphere fit against the opposing surface (surround shaft 3) as tightly as possible. The embodiment illustrated in FIG. 1 has three ring seals 12, one above another, on this side. The ring seal 13 on the side of barrier-air chamber 14 toward the inside of the pulverizer does not surround shaft 3 as tightly. The difference in the pressure of the barrier air and the pulverization air allows barrier air to penetrate into the pulverizer through the resulting gap. There is only one ring seal 13 at this point.

Ring seals 12 and 13 are made of carbon or another slippery material and are for product-engineering reasons radially divided into several sections. The sections are directly joined together and secured in position by an outer elastic element like a tubular spring 16. Ring seals 12 and 13 have stops 17 that project out of their outer circumference and prevent them from turning. Ring seals 12 and 13 can slide both in grooves 11 and over shaft 3. The section of shaft 3 in the vicinity of ring seals 12 and 13 can be surrounded by a machined sleeve. Ring seals 12 and 13 function in conjuction with the barrier air like a non-contacting seal and provide reliable sealing.

Figure 2:
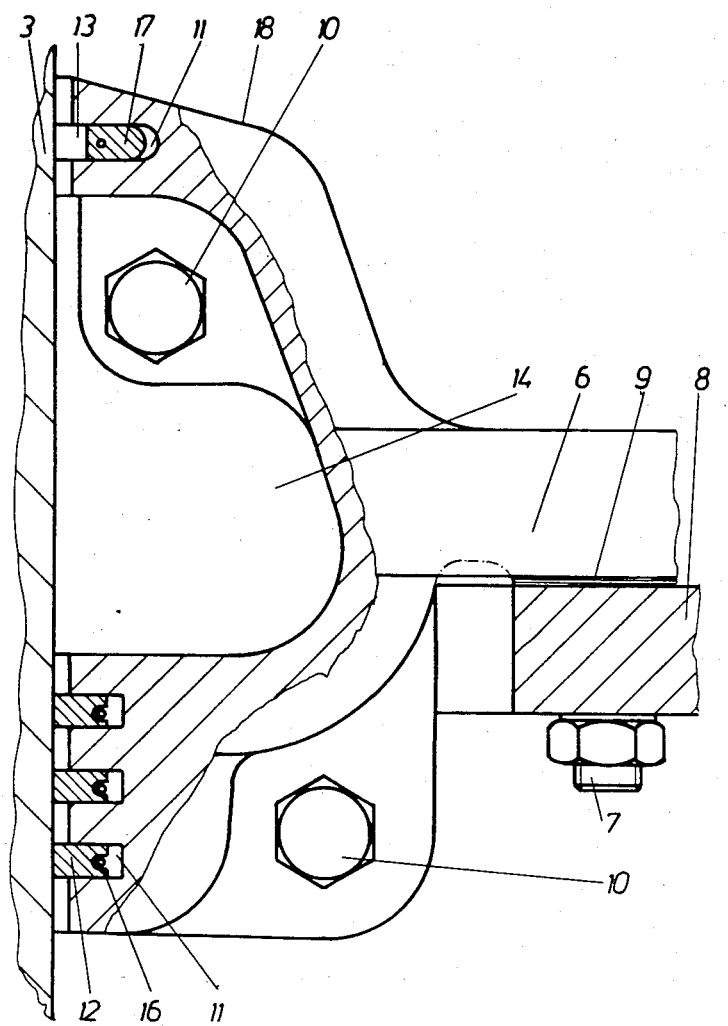
FIG. 2 is a longitudinal section and shows another embodiment in which the section of the ring-seal holder toward the inside of the pulverizer slopes down to prevent dust from building up above the ring seal.

The section of ring-seal holder 5 toward the inside of the pulverizer in the embodiment illustrated in FIG. 2 slopes down to prevent dust from building up above ring seal 13 between ring-seal holder 5 and shaft 3 as much as possible. This slope 18 begins at shaft 3.

Figure 3:
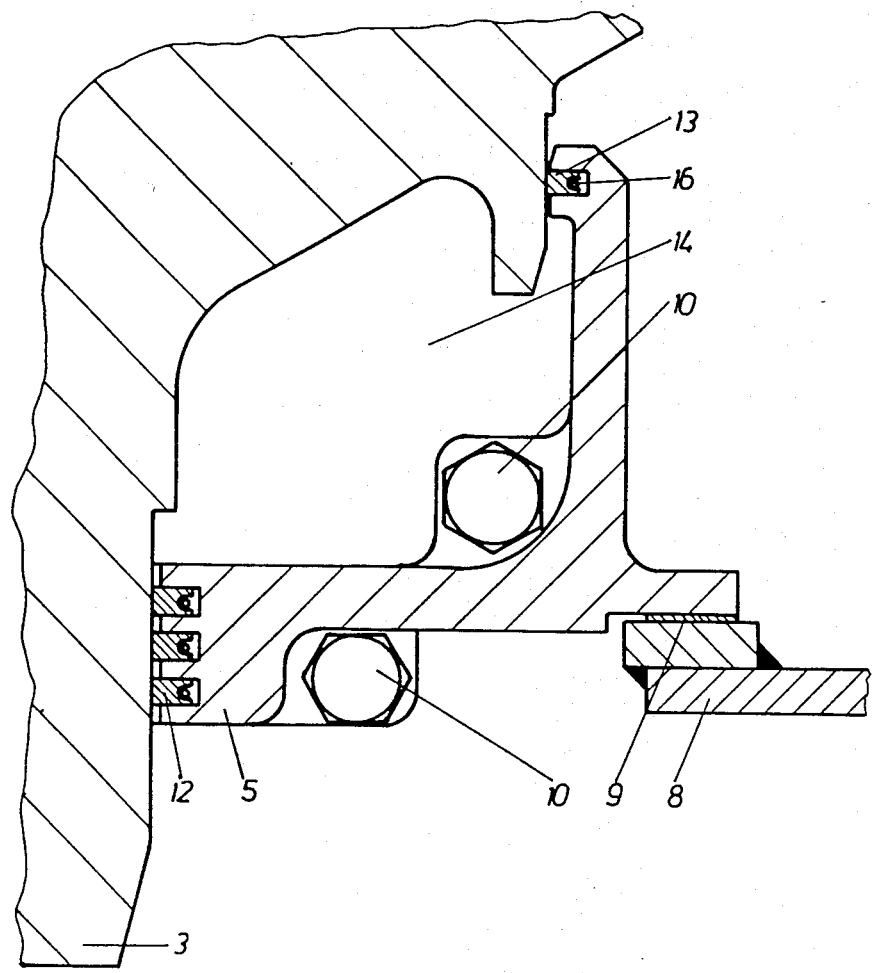
FIG. 3 is a longitudinal section and shows another embodiment in which the ring seal toward the inside of the pulverizer is positioned farther out and its inside diameter is longer than the remaining ring seals.

The ring seal 13 toward the inside of the pulverizer in the embodiment illustrated in FIG. 3 is positioned farther out and its inside diameter is longer than that of ring seal 12. Any dust that gets into barrier-air chamber 14 from inside the pulverizer will accordingly not arrive directly at ring seal 12.

Figure 4:
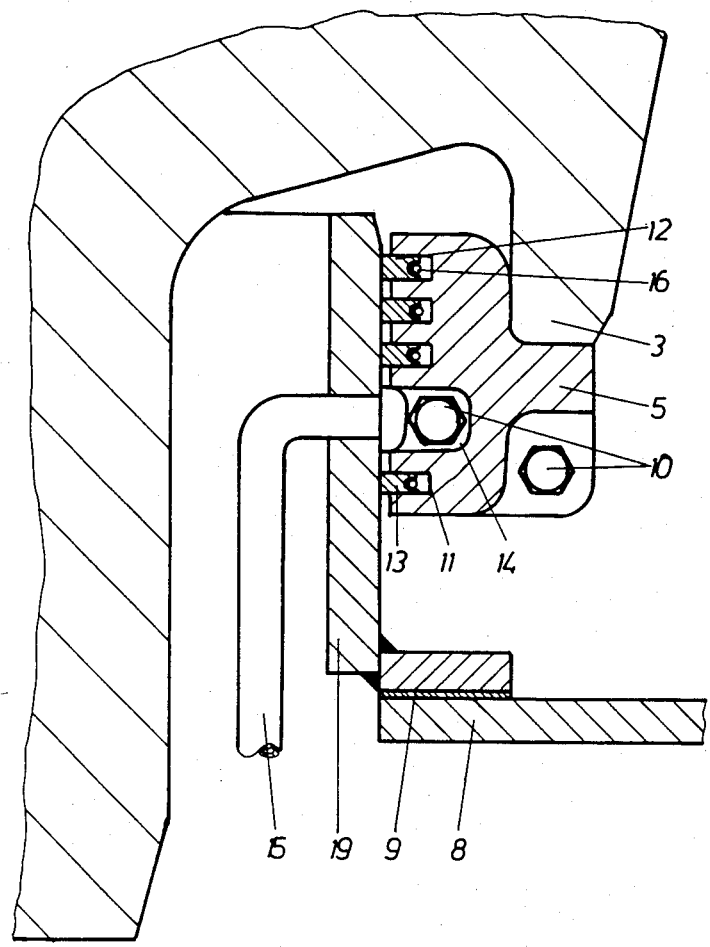
FIG. 4 is a longitudinal section and shows another embodiment in which a barrier-air connection is rigidly attached to the shaft.

The barrier-air connection 15 in the embodiment illustrated in FIG. 4 is rigidly attached to shaft 3. A cylindrical bushing 19 is mounted concentric with shaft 3 on the floor 8 of housing 1. Bushing 19 demarcates in conjunction with ring seals 12 and 13 the barrier-air chamber 14. The ring seal 13 toward the inside of the pulverizer and not fitting as tightly against the opposing surface is on the bottom of barrier-air chamber 14 in this embodiment. Connection 15 to barrier-air chamber 14 passed through bushing 19.

Figure 5:
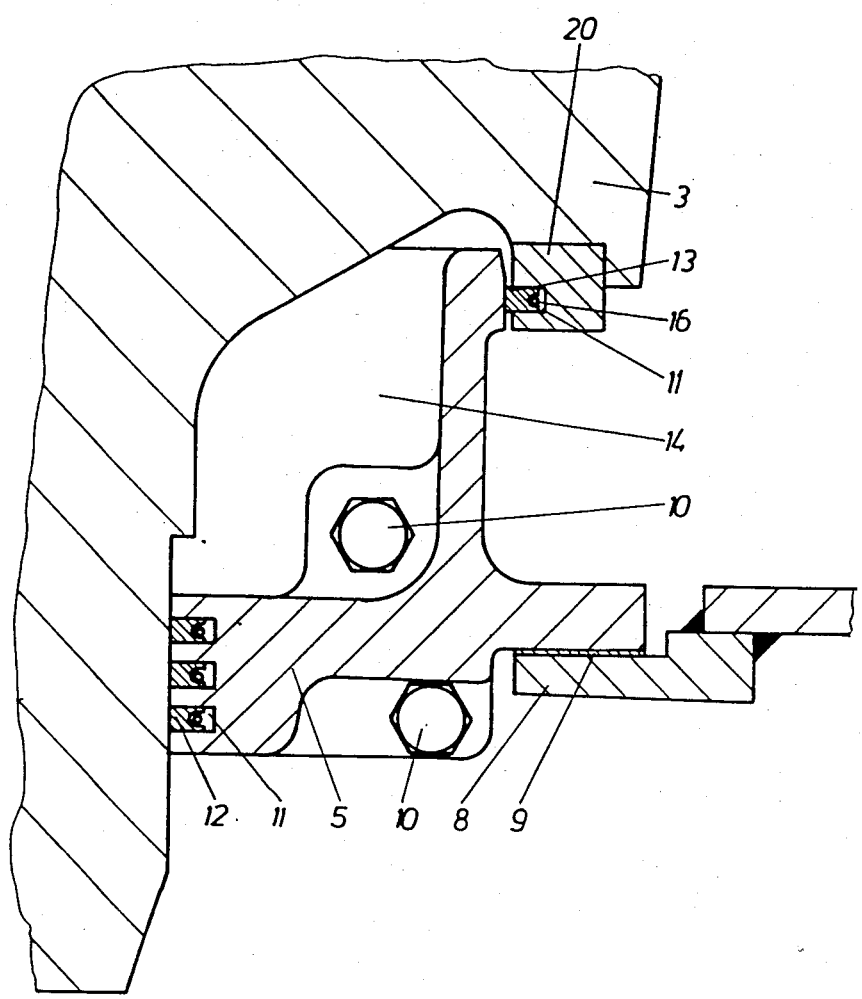
FIG. 5 is a longitudinal section and shows another embodiment which differs from that of FIG. 3 by the bottom of the gap between ring seal and shaft opening into the pulverizer.

The embodiment of ring-seal holder 5 illustrated in FIG. 5 is very similar to that illustrated in FIG. 3. The only difference is that the bottom of the gap between ring seal 13 and shaft 3 opens into barrier-air chamber 14 in FIG. 3 and into the pulverizer itself in FIG. 5. A ring holder 20 is accordingly fastened to shaft 3. The surface of ring holder 20 facing barrier-air chamber 14 has a groove 11 that accepts ring seal 13.

Although the present invention has been described with reference to a bowl-mill pulverizer as an example only. The invention can also be employed with barrier-air chambers specifically designed with a long diameter and intended to seal off a hot, dust-laden atmosphere from the outside atmosphere. Barrier-air chambers of this type can be employed between the stationary and rotating parts of tube-mill and impact pulverizers and metering screws for example.

We claim:

1. An arrangement for sealing off the inside of a pulverizer from the outside atmosphere, particularly a bowl-mill pulverizer comprising: a horizontal rotating bowl-type grinding ring rigidly connected to a shaft; a barrier chamber and ring seals in a ring-seal holder and bordering said barrier-air chamber, said ring seals comprising slide rings that demarcate the barrier-air chamber, a ring seal on a side of the chamber facing the inside of the pulverizer being arranged in a wider clearance with respect to the rotating part of the pulverizer than those ring seals on the other side.

2. A arrangement as defined in claim 1, wherein said ring seals are radially divided and secured in position by an outer elastic element.

3. An arrangement as defined in claim 1, wherein said ring-seal holder has a flange attached to a housing through flat packing.

4. An arrangement as defined in claim 1, wherein a section of the ring-seal holder toward the inside of the pulverizer slopes down from said grinding-ring shaft.

5. An arrangement as defined in claim 1, wherein said ring-seal that does not fit as tightly against its opposing surface is positioned at a longer diameter than the other ring seals.

6. An arrangement as defined in claim 1, wherein said ring-seal holder is rigidly attached to said shaft and said ring seals are opposite a rotationally symmetrical component of a housing.

* * * * *